United States Patent
Suleiman

(10) Patent No.: US 10,255,739 B1
(45) Date of Patent: Apr. 9, 2019

(54) METHOD AND APPARATUS FOR ROLLING CODE VEHICLE ACCESS

(71) Applicant: FORD GLOBAL TECHNOLOGIES, LLC, Dearborn, MI (US)

(72) Inventor: Ali Suleiman, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/836,418

(22) Filed: Dec. 8, 2017

(51) Int. Cl.
G07C 9/00 (2006.01)
B60R 25/24 (2013.01)
H04L 29/08 (2006.01)

(52) U.S. Cl.
CPC .......... *G07C 9/00309* (2013.01); *B60R 25/24* (2013.01); *H04L 67/12* (2013.01); *B60R 2325/10* (2013.01); *B60R 2325/205* (2013.01); *G07C 2009/00396* (2013.01); *G07C 2009/00404* (2013.01); *G07C 2009/00492* (2013.01)

(58) Field of Classification Search
None
See application file for complete search history.

(56) References Cited

U.S. PATENT DOCUMENTS

| | | | |
|---|---|---|---|
| 7,009,489 B2 * | 3/2006 | Fisher | G07C 9/00103 235/382 |
| 8,902,040 B2 * | 12/2014 | Greisen | G07C 9/00571 340/5.1 |
| 9,691,204 B2 | 6/2017 | Frykman et al. | |
| 9,809,197 B2 * | 11/2017 | Miyazawa | G07C 9/00309 |
| 2015/0294518 A1 | 10/2015 | Peplin et al. | |

* cited by examiner

*Primary Examiner* — K. Wong
(74) *Attorney, Agent, or Firm* — Jennifer Stec; Brooks Kushman PC

(57) ABSTRACT

A system includes a mobile-device processor configured to generate a first code based on a changing variable and a generation schema, both known by a mobile device and a vehicle and display the first code. The vehicle processor is configured to receive input of the first code, generate a second code based on the variable and schema, and grant vehicle access when the first code corresponds to the second code.

20 Claims, 3 Drawing Sheets

METHOD AND APPARATUS FOR ROLLING CODE VEHICLE ACCESS

TECHNICAL FIELD

The illustrative embodiments generally relate to methods and apparatuses for rolling code vehicle access.

BACKGROUND

Vehicles frequently include connectivity solutions that allow a vehicle computing system (VCS) to connect to a remote server. Manufacturers can use these connections to push software updates to a vehicle and to gather vehicle system data. Consumers benefit from the connectivity as it provides access to remote resources, such as email, application databases and the internet. Because vehicles can travel underground, between tall buildings and into remote areas, however, connectivity (typically done through cellular services) may not always be available. In instances where connectivity is lost, many services enabled or supported by the remote server may similarly be lost, until a remote connection is re-established. While this may not present a significant problem for non-critical applications, problems may arise if certain services that are important to a driver, which are also supported by the server, are not available on demand.

SUMMARY

In a first illustrative embodiment, a system includes a mobile-device processor configured to generate a first code based on a changing variable and a generation schema, both known by a mobile device and a vehicle and display the first code. The vehicle processor is configured to receive input of the first code, generate a second code based on the variable and schema, and grant vehicle access when the first code corresponds to the second code.

In a second illustrative embodiment, a computer-implemented method includes generating a first code on a mobile device and a second code in a vehicle, both based on a common changing variable and schema known to both the mobile device and vehicle. The method also includes receiving the first code input at the vehicle. The method further includes comparing the first code to the second code, responsive to the receiving and granting vehicle access based on the first code corresponding to the second code in a predefined manner.

In a third illustrative embodiment, a computer-implemented method includes modifying a clock value, synchronized between a vehicle and a mobile device, based on a predetermined modification formula known independently to the vehicle and mobile device, generating a first code on the mobile device and a second code on the vehicle. The method also includes outputting the first code on the mobile device, receiving the first code as vehicle input, and granting vehicle access, responsive to confirming that the first code matches the second code.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
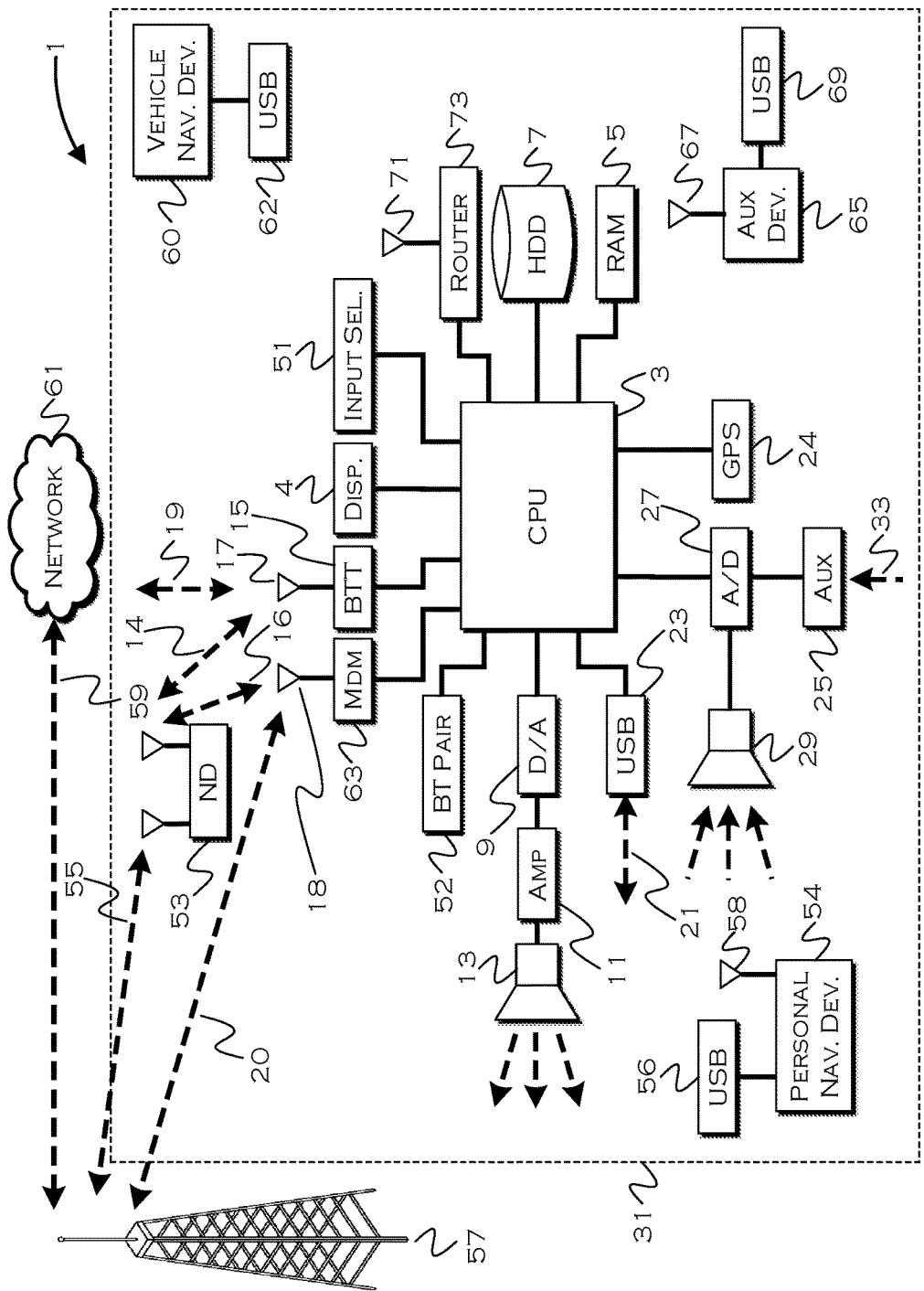
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

As previously noted, when a vehicle becomes disconnected from a communication connection (such that the vehicle simply has no current connectivity options), a driver may also lose any access to remote services facilitated by the server/connection. One of the lost services could include an access/powering authorization process, whereby the driver can enter or use a temporary code to access and/or start a vehicle.

In some models of code-based access, a driver will simply have a fixed code associated with a vehicle for entry and/or startup. By using the code, at any time, the driver can access and/or start the vehicle. While this is an incredibly convenient option, because the driver no longer needs to keep track of keys or a fob, this process may also be somewhat unsecure, in the sense that anyone who learns the code can use the code to access a vehicle at any time.

To address the above deficiency of fixed codes, some code-based access systems have begun relying on connectivity solutions, so that a remote server can generate a code for both a user and a vehicle, and deliver the code to both, such that a given code has an expiration time, but the user and the vehicle may both have access to a new code whenever needed. These codes could be issued on-demand or periodically as the old code expires. This solution solves the problem of the persistent code, but if the vehicle lacks connectivity, then an old code may expired based on time or usage, and the vehicle may be unable to obtain a new code. If the vehicle is in a location where connectivity simply cannot be established (e.g., underground or in the mountains), then the vehicle can never obtain a new code and the user (who may be without keys or a fob) could be left stranded, unable to move the vehicle to a connectivity enabled location.

The illustrative embodiments allow for a rolling-key solution to the preceding problems. The rolling key concept produces a new key at periodic intervals, and typically usable for the periodic interval. The key is generated based on a code (hash, algorithm, etc) known to both the vehicle and a user device, so that the vehicle can self-generate the next code at the intervals, without requiring access to the cloud to obtain a new code. Since the user device and vehicle generate the new code at the same intervals, at any given time, the code available to the user should be the same as the code which the vehicle uses for verification. When the code expires, both the user (through a device) and vehicle are capable of generating identical new codes. Thus, even in the absence of connectivity, new, random codes can be generated and used, which solves both the persistence and connectivity problems previously noted.

Figure 2:
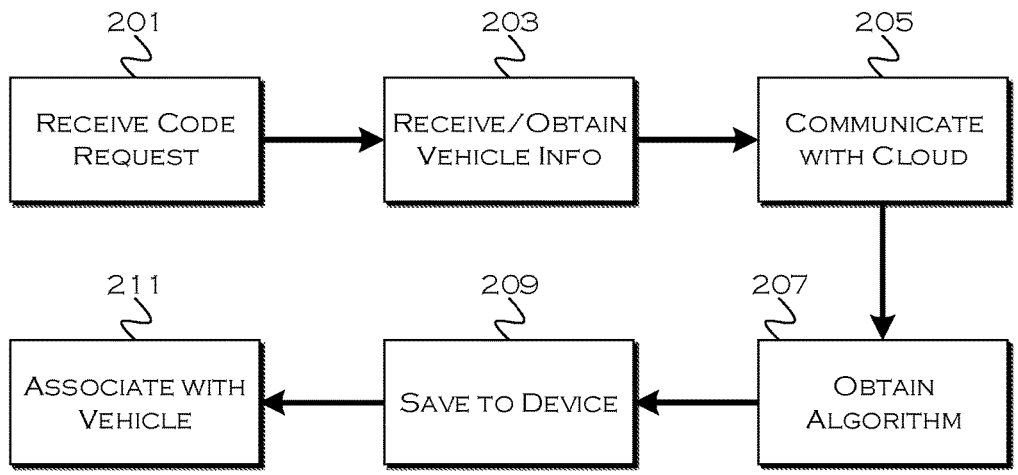
FIG. 2 shows an illustrative code synchronization process.

FIG. 2 shows an illustrative code synchronization process. In this illustrative example, both the vehicle and the user device (frequently a phone or watch) will use a hash or algorithm relative to a synchronized clock in order to produce a code. The code will typically vary from vehicle to vehicle, but both the user and vehicle will know the algorithm or hash to use in order to generate the code. Both systems may also synchronize to an agreed-upon clock (e.g., server master-clock), to ensure that the clock basis for the code does not vary. Since the vehicle and phone can maintain a clock count in the absence of a connection, once the synchronization is established, the process should result in the same code at both sources. Periodic resynchronization can occur to ensure that both devices are on the same clock, whenever connectivity is available to both devices.

In this example, the process (often an application on a mobile device) receives 201 a request to add a vehicle. This will allow the process to store a discreet coding secret (hash/algorithm/etc) for a specific vehicle. The same application could store multiple coding secrets for multiple vehicles, but typically there will be a different secret for each vehicle. It is possible, however, to use the same code for all vehicles owned/driven by a certain person. In fact, in a ride-sharing situation, a vehicle may be equipped to authenticate a wide variety of codes, and a specific code assigned to a driver (as opposed to a vehicle) could be used to both access the vehicle and to identify the driver. In that example, the vehicle would either have to know the secret for that driver based on a previous connection, or authenticate the code based on some more generic principle (e.g., the code has certain characteristics that identify it as a valid code, and the vehicle can (when possible) use connectivity to identify a specific driver based on the code). All of these solutions could work based on a rolling-code in the absence of connectivity, and all (and the like) are contemplated.

In this process, the application receives 203 (from the vehicle or owner input) or otherwise obtains vehicle identification information (e.g., VIN). The process then communicates 205 with the cloud. In another example, the application could already have a pre-established relationship with a given vehicle (based on ownership of the phone and vehicle, for example) and could contact the cloud first, whereby the cloud could then identify the vehicle. Once the application/device is associated with a given vehicle, the remote process can select a given secret algorithm and send 207 the algorithm to the requesting device. This algorithm may have been pre-associated with the vehicle at a time of manufacture (e.g., hardcoded or firmcoded) or it may be transferred to the vehicle as well as the owner mobile device.

The process saves 209 the code to the mobile device, and associates 211 the code (on the mobile device) with a given vehicle. This last step is most useful if multiple vehicles are to be accessed through a given device. In the model where the code identifies an owner and is usable on multiple vehicles, the code is associated with a given owner.

Figure 3:
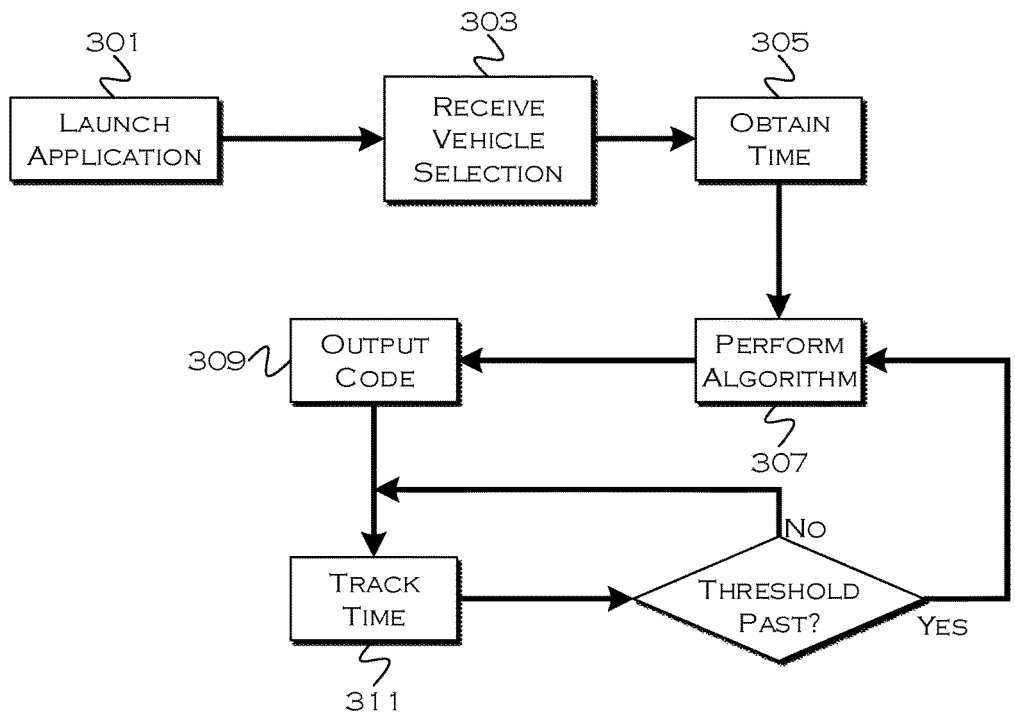
FIG. 3 shows an illustrative code presentation process.

FIG. 3 shows an illustrative code presentation process. In this example, the process launches 301 an application, which will be used to generate the access code for a vehicle. The application may present a list of known vehicle secrets (identifying vehicles, not the secrets) and receive 303 a selection from the list of a certain vehicle.

The process also uses 305 a last synchronized clock to obtain a time. In this example, the process will not connect to the server, even if available, to obtain the time, unless the process also knows the vehicle can connect. Thus, by using the last synchronized time, the process has the greatest chance of using the same time as a vehicle. Once the time is obtained, the process may perform 307 the secret algorithm or hash on the time, to produce a code. Whether this hash is performed at automatic intervals or on-demand, as long as the vehicle is using the same secret performed on the same time, the codes should synchronize. That is, the code could regenerate every 646 seconds and be valid for every 646 seconds, and thus both systems would use the time that corresponded to the most recent 646 second interval (e.g., if it was currently 5:10:45, both systems might use 5:00, depending on when the interval started). In other models, the code could be used upon request and valid for a certain period of time following generation, and in that case the vehicle may have to de-hash the code (reverse the coding) to determine if the time resulting from reversal was within the permissible window. That is, the vehicle may not know the exact time when the code was generated on the user device, but by reversing the process the vehicle could know if the request corresponded to a time within the last 646 second interval.

Again, as long as the vehicle and device have the same coding strategy and the same clock, the codes should be synchronized in a recognizable format, regardless of which type of regeneration process is preferred or used. In this example, for the sake of the example only, the process automatically generates a code every X minutes, whether or not the user has requested a code. That is, when the user does request a code, the start of the current X minute interval is used as the basis, the start of the entire time period having been synchronized at the time of inception. The process thus uses the most recent X minute interval start time to generate the code and outputs 309 the code for the user to input to the vehicle.

Since the code expires every X minutes, the process continues to track 311 time after the code is requested. Since the request could have come in seconds before a rollover to a new X minute period, the process, by tracking the time, can produce a new code based on the newly started X minute interval if the old interval threshold time has passed 313. For example, if the code reset every 5 minutes, starting at midnight, and the request came in at 7:59:56, the user only has 4 seconds to input the code before the vehicle will generate a new (8:00:00) code and not recognize the old code as valid. But, since the process shown in FIG. 3 is tracking the time, the process will also generate the new code at 8:00:00, and thus the owner will have the new code, which is the code the vehicle will now recognize (until 8:05:00) as valid.

Figure 4:
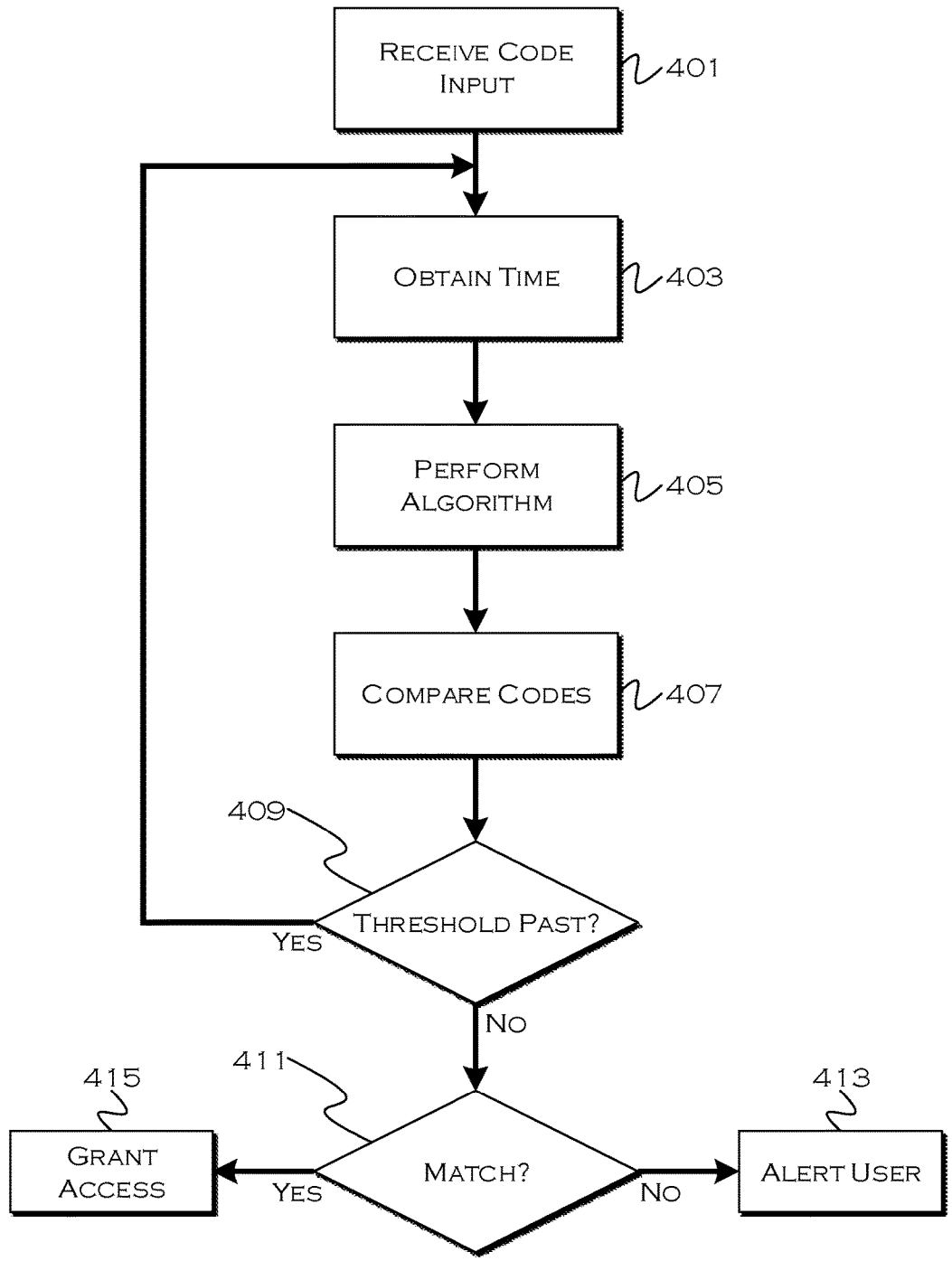
FIG. 4 shows an illustrative code utilization process.

FIG. 4 shows an illustrative code utilization process. This is the vehicle side process that receives 401 the code from the user and compares the code to the vehicle generated code. In this example, the process receives the code and obtains 403 the time. As previously noted, the relevant time could be the current time or the start of a current time interval. Since the vehicle has a copy of the same hash/algorithm that the phone has (or at least a corresponding equivalent), the process performs 405 the secret algorithm on the relevant time to produce a vehicle-side code. As previously noted, the process on the vehicle could decode the code input by the user, in order to obtain a time, which the process could then verify was within a current time window, in an alternative solution.

Here, the process compares 407 the received code with the generated code to determine if there is a match 411. If, at any time, the time interval threshold passes 409, the process will obtain the new relevant time 403. If the codes do not match, perhaps because the user got the code wrong, or perhaps because the time interval expired, the process can warn 413 the user. If the codes match, the process can grant 415 vehicle access and/or start the vehicle.

Through use of the illustrative embodiments, and the like, a secure and private shared code method can be developed, which does not require connectivity at the time of code entry for verification purposes. This can allow users to use a safer (randomized) code access method even when a vehicle is out of connectivity range and a previous code has expired. This system could even be coupled to a connectivity enabled solution, switching, for example, whenever the vehicle dropped connectivity or could not establish a connection.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a mobile-device processor configured to:
generate and display a first code based on a changing variable and a generation scheme, both known by a mobile device and a vehicle, the scheme defining fixed time-intervals for code changing; wherein
a vehicle processor is configured to:
receive the first code;
generate a second code based on the variable and scheme; and
grant vehicle access when the first code corresponds to the second code.

2. The system of claim 1, wherein the changing variable includes a clock value.

3. The system of claim 2, wherein the clock value is periodically synchronized to both the mobile device and vehicle, when both are connected to a remote server at a same time.

4. The system of claim 1, wherein the first code corresponding to the second code includes the first code matching the second code.

5. The system of claim 1, wherein the mobile-device processor is configured to identify the vehicle to a remote server to obtain the schema from the remote server.

6. The system of claim 5, wherein the vehicle processor is configured to obtain the schema obtained by the mobile device, from the remote server, based on the schema being provided to the mobile device and the vehicle processor being associated with the vehicle identified by the mobile device.

7. The system of claim 5, wherein the mobile-device processor is configured to identify the vehicle based on a vehicle identification number.

8. The system of claim 1, wherein the mobile-device processor is configured to save a plurality of schemas, including the generation schema and other generation schema, each schema associated with a user-selectable vehicle.

9. The system of claim 1, wherein the access includes vehicle entry.

10. The system of claim 1, wherein the access includes vehicle startup.

11. A computer-implemented method comprising:
generating a first code on a mobile device and a second code in a vehicle, both based on a common changing variable and scheme known to both the mobile device and vehicle, the scheme defining fixed time intervals for generating a new code;
receiving the first code input at the vehicle;
responsive to the receiving, comparing the first code to the second code; and
granting vehicle access based on the first code corresponding to the second code in a predefined manner.

12. The method of claim 11, wherein the changing variable includes a clock value.

13. The method of claim 12, further comprising periodically synchronizing both the mobile device and vehicle to the clock value stored on a remote server, when both are connected to the remote server at a same time.

14. The method of claim 11, wherein the first code corresponding to the second code includes the first code matching the second code.

15. The method of claim 11, further comprising identifying the vehicle from the mobile device to a remote server to obtain the schema at the mobile device from the remote server.

16. The method of claim 15, further comprising obtaining the schema at the vehicle, corresponding to the schema obtained by the mobile device, from the remote server, based on the schema being provided to the mobile device and the vehicle being associated with the vehicle identified by the mobile device.

17. The method of claim 15, further comprising identifying the vehicle based on a vehicle identification number.

18. The method of claim 11, wherein the access includes vehicle entry.

19. The method of claim 11, wherein the access includes vehicle startup.

20. A computer-implemented method comprising:
- modifying a clock value, synchronized between a vehicle and mobile device, based on a predetermined modification formula known independently to the vehicle and mobile device, to generate a first code on the mobile device and a second code on the vehicle;
- outputting the first code on the mobile device;
- receiving the first code as vehicle input; and
- responsive to confirming that the first code matches the second code, granting vehicle access.

\* \* \* \* \*